United States Patent [19]

Nobbe et al.

[11] Patent Number: 5,551,064
[45] Date of Patent: Aug. 27, 1996

[54] METHOD AND APPARATUS FOR COMMUNICATION UNIT FREQUENCY ASSIGNMENT

[75] Inventors: Dan W. Nobbe, Keller; Ronald L. Royer, Grapevine, both of Tex.

[73] Assignee: Motorola, Inc., Schaumburg, Ill.

[21] Appl. No.: 281,310

[22] Filed: Jul. 27, 1994

[51] Int. Cl.$^6$ ................................................. H04B 15/00
[52] U.S. Cl. ......................... 455/62; 455/33.1; 455/34.1; 455/34.2; 455/54.1; 455/56.1; 379/59
[58] Field of Search ............................. 455/62, 63, 34.1, 455/34.2, 54.1, 56.1, 54.2, 53.1, 33.1; 379/59

[56] References Cited

U.S. PATENT DOCUMENTS

| | | | |
|---|---|---|---|
| 5,038,399 | 8/1991 | Bruckert | 455/33 |
| 5,203,008 | 4/1993 | Yasuda et al. | 455/33.1 |
| 5,203,012 | 4/1993 | Patsiokas et al. | 455/34.1 |
| 5,212,831 | 5/1993 | Chuang et al. | 455/54.1 |
| 5,241,685 | 8/1993 | Bodin et al. | 455/33.2 |
| 5,295,138 | 3/1994 | Greenburg et al. | 370/57 |
| 5,345,597 | 9/1994 | Strawczynski et al. | 455/34.1 |

OTHER PUBLICATIONS

J. C-I Chuang, "Autonomous Adaptive Frequency Assignment for TDMA Portable Radio Systems", Fourth Nordic Seminar on Digital Mobile Radio Communications, Jun. 26-28, 1990, Oslo, Norway, Paper 9.2.

J. C-I Chuang, "Operation and Performance of a Self-Organizing Frequency Assignment Method for TDMA Portable Radio", IEEE Globecom '90, San Diego, CA, Dec. 2-5, 1990, pp. 1548-1552.

J. C-I Chuang, "Autonomous Frequency Assignment and Access for TDMA Personal Portable Radio Communications", IEEE VTC '91, St. Louis, MO, May 19-22, 1991.

Donald Cox and Douglas Reudink, "A Comparison of Some Channel Assignment Strategies in Large-Scale Mobile Communications Systems", IEEE Transactions on Communications, Apr. 1972, pp. 190-195.

*Primary Examiner*—Reinhard J. Eisenzopi
*Assistant Examiner*—Lee Nguyen
*Attorney, Agent, or Firm*—Raymond J. Warren; Kevin A. Buford

[57] ABSTRACT

A method and apparatus for establishing frequency assignments for a fixed radio communication unit of plural fixed radio communication units coupled via a controller. A controller functions to have the communication unit measure transmitted signal strengths, and to request the other fixed radio communication units to transmit at assigned frequencies. The system functions to identify and select one (or more) of the frequencies measured having the lowest signal strength and adjacent channel and/or co-channel interference characteristics beneath set threshold level(s). The system also operates to repeat the process for each fixed radio communication unit, until all are assigned frequencies.

10 Claims, 4 Drawing Sheets

METHOD AND APPARATUS FOR COMMUNICATION UNIT FREQUENCY ASSIGNMENT

FIELD OF THE INVENTION

The present invention relates generally to communication systems and more particularly to a system for frequency assignment for multiple communication units.

BACKGROUND OF THE INVENTION

With the increasing demand for wireless communications, a strong need has developed for better ways to increase the amount of traffic capacity that can be carried in allocated radio spectrum bands. In order to achieve increased capacity, a variety of multiple access approaches have been devised, including the well known approaches of frequency division multiple access (FDMA), time division multiple access (TDMA), and code division multiple access (CDMA) approaches. In communications systems such as cellular and the emerging personal communication services (PCS), both the older analog (e.g., North American AMPS, or Advanced Mobile Phone Service) and newer TDMA digital services (e.g., the European GSM, or Group Speciale Mobile) rely on some form of frequency division to achieve optimal traffic capacity while maintaining acceptable signal quality.

The conventional approach towards achieving increased capacity in a system using frequency division is to divide a larger service area into smaller "cells," and "reusing" the frequencies within an allocated band among the cells. The amount of reuse permitted, or in other words the minimum distance before a frequency may be repeated in another cell, is typically calculated using a static plan taking into consideration the probable amount of co-channel interference. Co-channel interference is interference arising in one signal's bandwidth from another signal having an overlapping bandwidth. Since the amount of co-channel interference is dependent on the distance between the overlapping-channel broadcasting stations, the chief consideration in static modeling for reuse patterns has been maintaining a sufficient distance between cells reusing the same frequency so that a calculated received signal power in one cell for a signal transmitted in another cell is kept below a predetermined threshold. Improvements have also been made by taking into consideration known structures and seasonal sources (such as foliage) causing readily modeled additional propagation losses.

A shortcoming of all static modeling is that actual propagation patterns within a coverage area will vary, sometimes significantly, from predicted patterns. This variance becomes even more pronounced in smaller cell patterns, such as are typically found in PCS or microcellular systems, where the sources of interference (buildings, trees and the like) are more pronounced in view of the lower antennas and lower transmit power used in smaller rather than larger cellular or trunked radio systems. As a consequence, static modeling alone may leave certain coverage areas too close for actual propagation characteristics, with actual signal quality being degraded beneath desired or even acceptable levels.

An improvement has been proposed for PCS applications in order to safeguard against this loss of signal quality. This improvement, sometimes referred to as a quasi-static automatic frequency assignment (QSAFA) process, uses actual measured signal strengths from surrounding radio ports (base stations), served by a common controller (a RPCU, or radio port controller unit), to determine which of a possible group of frequencies has the lowest signal strength at the measuring radio port. This lowest frequency is selected for use by the radio port, on the assumption that it will have the best performance (i.e., exhibit the least co-channel interference) within the radio port's coverage area. This process is performed for each radio port controlled by the RPCU, and repeated a number of times to insure the best selections for all radio ports.

While QSAFA represents an improvement over static planning, it fails to take into account several other important sources of signal degradation. In particular, neither QSAFA nor static modeling provide any method for measuring and correcting for actual adjacent channel or intermodulation interference. Adjacent channel interference arises from side lobe or spill over energy from one channel overlapping with the transmit band of another channel. Intermodulation interference occurs due to the interaction of multiple carriers in a non-linear device. Approaches such as QSAFA may even exacerbate problems with adjacent or intermodulation interference, since QSAFA always picks the channel with the lowest signal strength, even if it is located immediately adjacent the channel with the strongest signal strength. A need therefore exists for an improved method of allocating frequencies to avoid unacceptable losses in signal quality.

DETAILED DESCRIPTION OF AN EMBODIMENT

Figure 1:
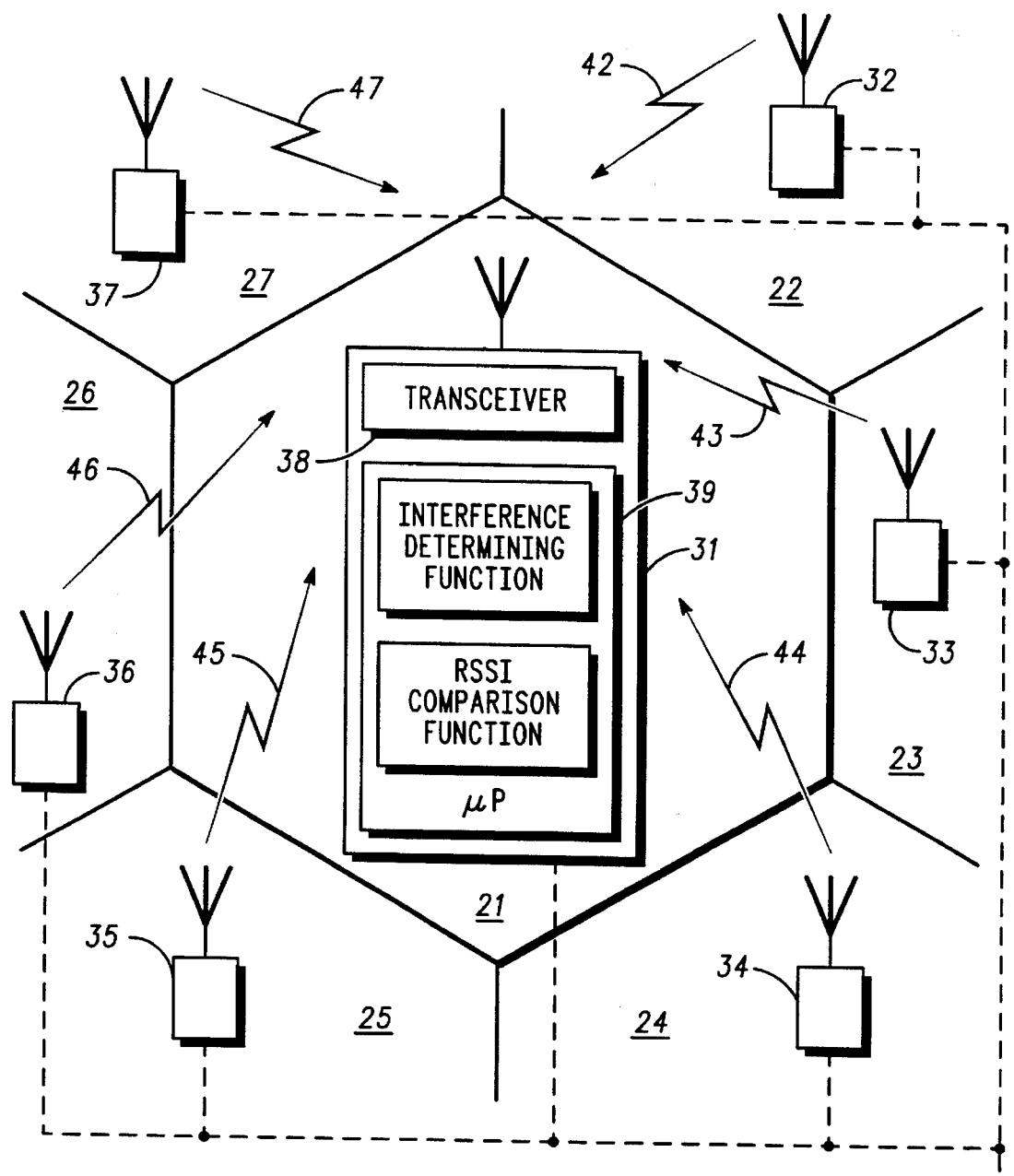
FIGS. 1 is a diagram illustrating a system according to an embodiment of the invention.
Figure 1:
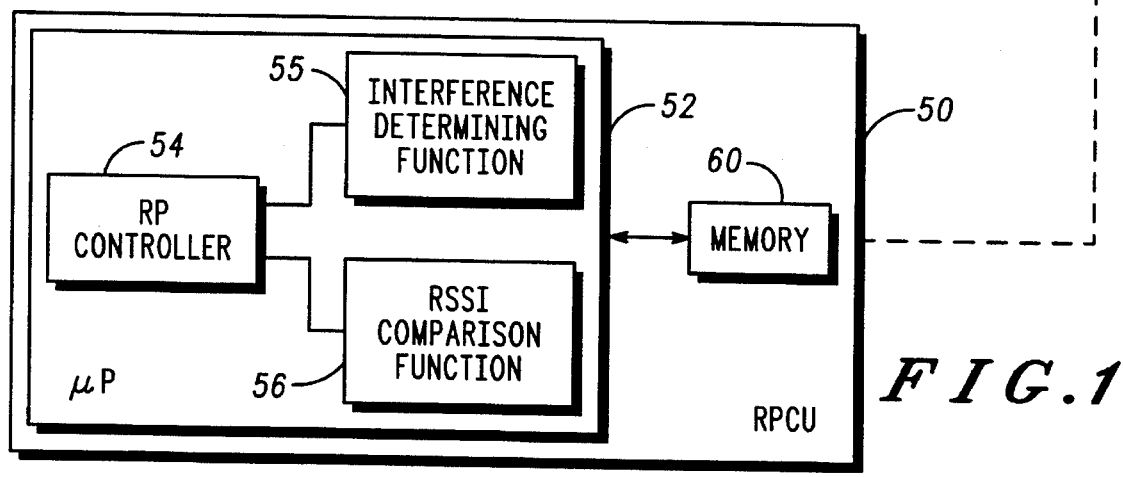

These problems and others are met with a system for assigning frequencies according to the present invention. FIG. 1 shows a diagram of a system for implementing a PCS system according to the invention. It should be understood, however, that the invention has application to other types of communications systems, including but not limited to cellular, trunked radio, and in-building wireless communications systems, and that the following description, of a presently preferred embodiment for one type a PCS system, is meant for illustration and not limitation on the scope of the invention.

In FIG. 1 a number of cell coverage areas 21–27 are shown each having a radio ports (RPs, or base station radio communication units) 31–37, respectively, for communicating with subscriber units. Each of the radio ports is connected, typically by wire or fiber optic cable, although microwave or other wireless channels may be used, to a radio port controller unit (RPCU, or communication controller unit) 50. RPCU 50 functions to control all of the radio ports, and to provide a connection to a public switched telephone network (PSTN, not shown) or other form of data or voice communications network. In particular, RPCU will typically include a processor 52 and memory 60, where the processor is programmed to control the radio ports 31–37 via a controller circuitry/functionality 54. In addition, processor 52 includes appropriate circuitry/functionality 56, for making received signal strength (RSSI) comparisons and interference level determinations. These determinations are made from RSSI measurements made at radio port 31 of signals 42–47 transmitted by radio ports 32–37, respectively.

Figure 2:
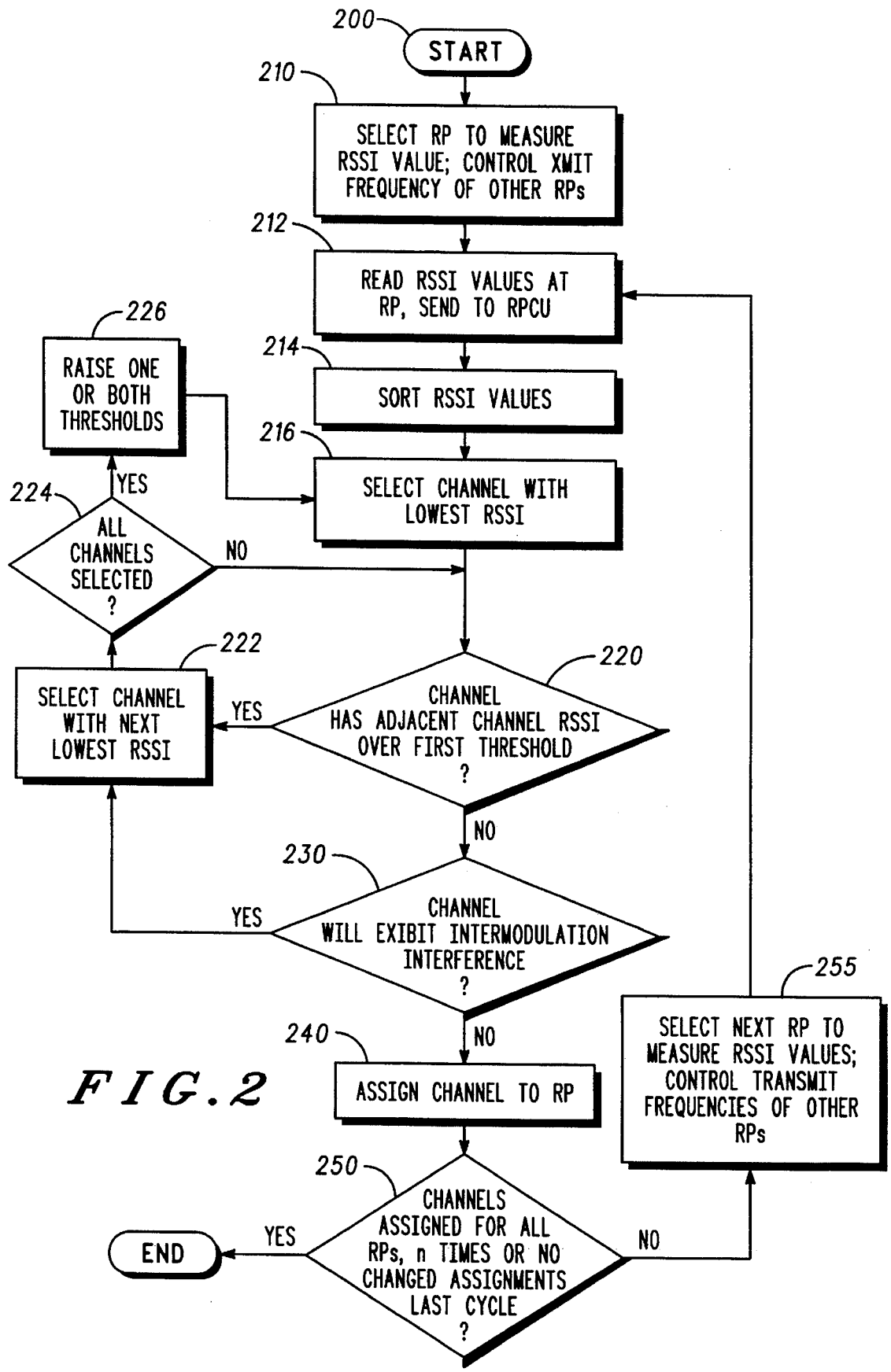
FIG. 2 is a flow chart illustrating a method for assigning a frequency, for use with the system of FIG. 1, according to an embodiment of the invention.
Figure 3:
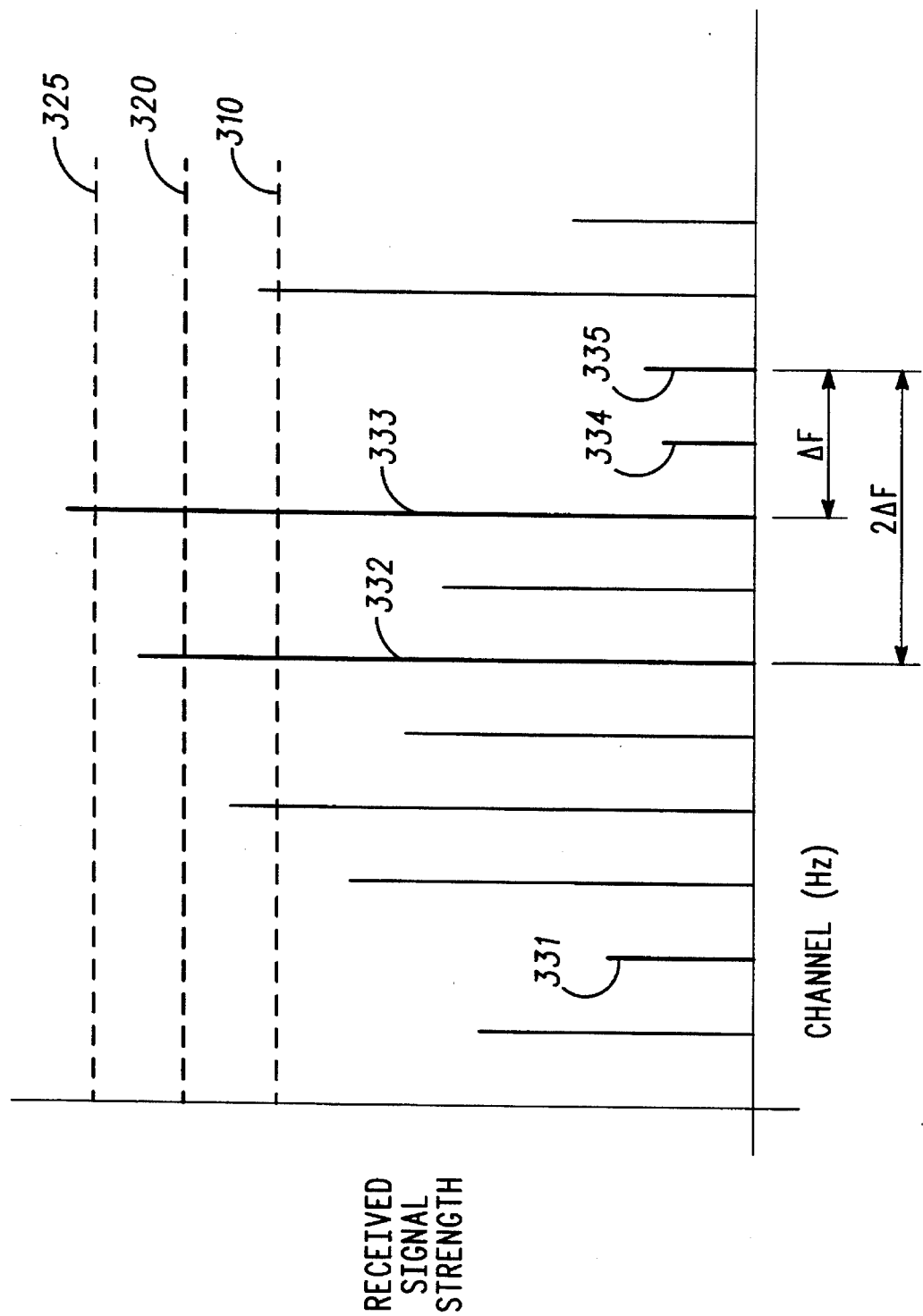
FIG. 3 is a graph showing a spectrum of measured frequencies further illustrating the method of FIG. 2.

The process by which this embodiment is carried out can be better understood by additional reference to FIGS. 2 and 3. The process commences with an initiation signal. Although the frequency assignment process can be performed on a regular basis, in systems such as PCS it is not anticipated that the process will need to be performed except when the configuration of serving radio ports changes (for example when new radio ports are added, or when a current radio port is moved) or when environmental factors change. Examples of such environmental factors may include seasonal changes, (e.g. reduced foliage in winter causing increased propagation ranges) and new interferers (new buildings and the like) in the coverage area. Thus, except when new ports are added it is anticipated that the frequency assignment process may be done periodically, and may also be initiated upon occurrence of some predetermined event such as an increase in dropped calls or the like.

Upon initiation, the RP controller 54 of RPCU 50 selects a first radio port (RP 31 in FIG. 1) for RSSI measurements. At the same time it controls the remaining RPs 32–37 to transmit on a set frequency or frequencies, which will typically be the last assigned frequencies being assigned/used by these RPs (step 210). RP 31 then tunes to each of the frequencies being broadcast by the RPs 32–37 and takes a measurement of a signal characteristic, typically measuring the RSSI (step 212). While FIG. 1 illustrates a group of seven RPs being controlled by RPCU 50, one skilled in the art will readily appreciate that the number of RPs, as well as the number of frequencies assigned to a given RP and hence transmitted in step 210, may vary considerably based on desired operator configurations. Further, the group of frequencies need not be limited to just the frequencies being used by RPs controlled by the same controller, since the group may additionally include frequencies used by RPs controlled by neighboring RPCUs, and coordination with neighboring RPCUs may be implemented to control the RPs of a number of RPCUs to broadcast at the same time.

After radio port 31 has finished its RSSI measurements, the measured RSSI values and corresponding frequencies are sent to RPCU 50 and stored in memory 60. Processor 52 then determines which frequency has the lowest (or optimal) RSSI value (steps 214–16). The RSSI values of the frequencies adjacent the selected channel are then compared with a predetermined threshold, one selected to maintain any adjacent channel interference at acceptable levels (step 220). For example, turning to FIG. 3 for illustration, although channel 334 has the lowest RSSI, it has an adjacent channel 333 above the threshold 310. As a consequence the next lowest channel 335 is selected (step 222). A further comparison is made of other frequencies capable of yielding intermodulation interference to insure that these channels remain below a second predetermined threshold (step 230). In the example of FIG. 3, two channels 333, 332 are located at Δf and 2*Δf separation from channel 335, and thus are capable of yielding third order intermodulation interference. Both of these channels are also above a second predetermined threshold 320. Thus, using threshold 320 channel 335 would not be selected. Rather, the processor would return to select the channel with the next lowest RSSI, channel 331 (step 222). One skilled in the art will understand that a variety of thresholds may be used, depending on the performance and signal quality desired by the system. Additional thresholds may also be used, for example using another intermodulation threshold if higher order intermodulation products are considered.

If all the group of frequencies have been processed and none is selected, the system is adaptive to adjust (raise) one or more of the thresholds (steps 224, 226, to threshold 325). Steps 216 through 230 are then repeated until a channel is selected. Thus, even though a higher than desired interference level may result, at least the frequency at which the channel may operate with the generally best available signal quality is selected (step 240).

Once a frequency (or frequencies if multiple channels are used by RP 31) is selected, RPCU 50 functions to select another radio port, and repeat the frequency assignment process until all of the radio ports of interest (typically all of the RPs controlled by the RPCU 50) have newly assigned frequencies selected. To insure that a stable system frequency assignment is achieved, the entire process is repeated a number of additional times (for example, 5 complete cycles). The number of cycles is preferably adaptive depending on the number of changed frequency assignments made in the last cycle. (Steps 250–255.)

Figure 4:
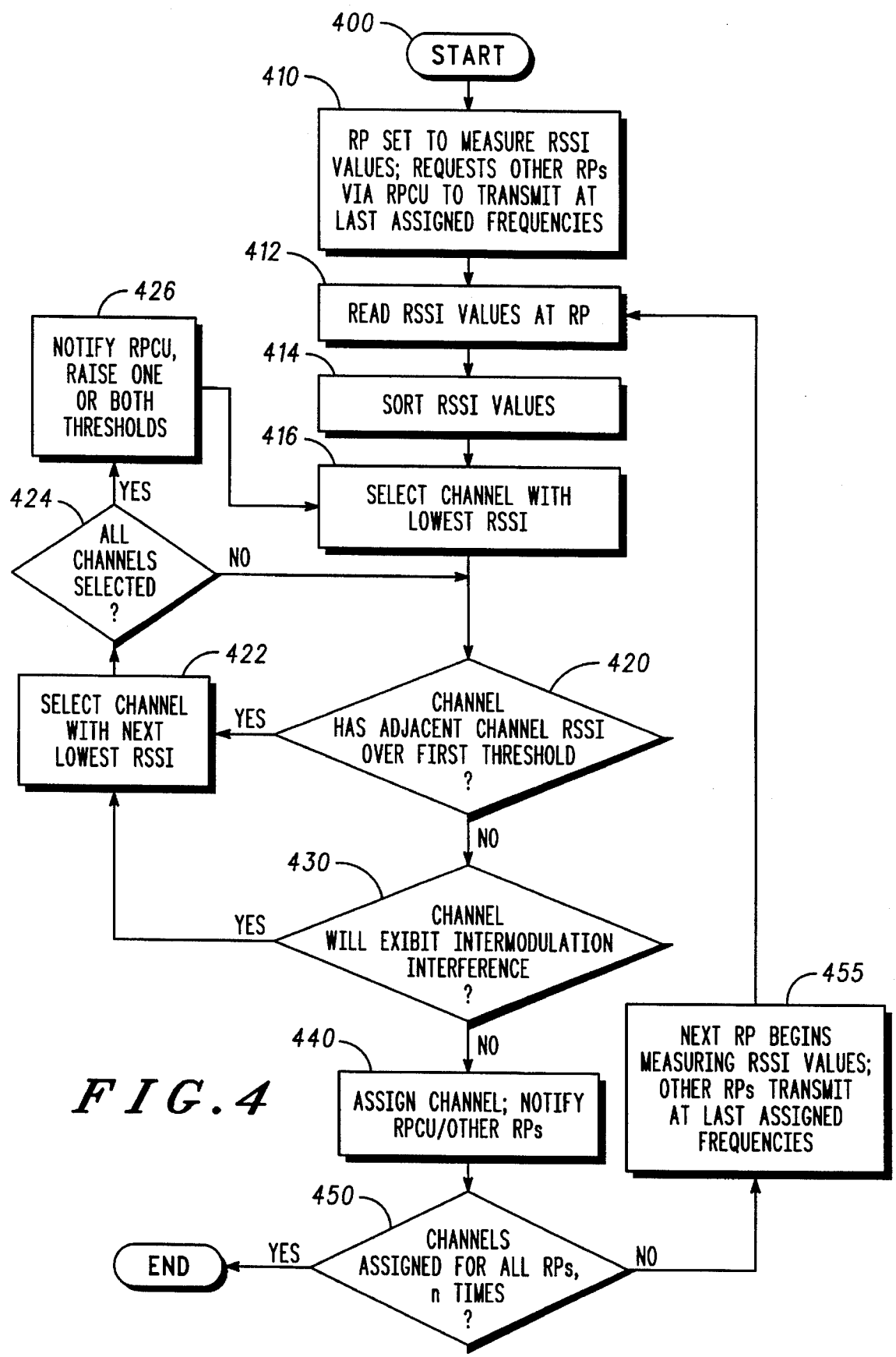
FIG. 4 is a flow chart illustrating a method for assigning a frequency, for use with the system of FIG. 1, according to an second embodiment of the invention.

Turning now to FIG. 4, an alternative embodiment of the invention is illustrated. The primary difference between the embodiments of FIGS. 2 and 4 is in this latter embodiment the bulk of the processing is performed in the RPs rather than the RPCU 50. The process is again initiated (step 400) typically at RPCU 50, although it is possible for an RP to also initiate (for instance, when a new RP is installed and is preparing for service). A message is sent to the other RPs at this time to transmit at their last assigned frequencies, and RP 31 measures the signal characteristic (typically the RSSI) for the group of frequencies (steps 410–12).

At this point, unlike the system of FIG. 2, the measured RSSI values are stored at the RP (e.g. in a memory similar to RPCU memory 60) and processed in a processor (e.g. in a processor having similar circuitry/functionality as RPCU processor 52). Thus, the steps of sorting for the frequency with the lowest RSSI and determining whether any adjacent channel or intermodulation interference is below set thresholds (steps 414–430) are substantially the same as steps 214–230, except for being performed in the RP 31. One implementational difference may occur, depending on whether a centralized control over the threshold level is found desirable. In this case step 426 would require some communication with the RPCU to determine which threshold(s) to raise and by how much.

Once a channel is selected, RP 31 notifies the RPCU 50 and/or other RPs 32–37, so all RPs can proceed through the same frequency assignment steps. The whole process is again repeated for a number of additional times (for example, 5 complete cycles) to insure that a stable system frequency assignment is achieved. (Steps 450–455.)

The invention has thus been described with reference to illustrative embodiments thereof. It will be apparent to one skilled in the art that various modifications and changes can be made without departing from the spirit and the scope of the invention in view of the claims below.

We claim:

1. A method of determining frequency assignment for a first of a plurality of fixed radio communication units each coupled to a communication controller, comprising:

(a) requesting all of the plurality of fixed radio communication units except the first fixed radio communication unit to transmit each at a predetermined frequency, and requesting the first fixed radio communication unit to measure a signal characteristic of each of a first group of frequencies including at least each predetermined frequency;

(b) determining a first frequency of the first group of frequencies having a lowest measured signal characteristic;

(c) determining whether an adjacent one of the first group of frequencies has a measured signal characteristic of at least a first predetermined threshold, and if not, selecting the first frequency for use by the first fixed radio communication unit;

(d) when the determining step of step (c) has a positive determination, determining a next frequency of the first group frequencies having a next lowest measured signal strength and repeating step (c) for the next frequency;

(e) repeating step (d) until one of the first group of frequencies is selected or step (d) is repeated a predetermined number of repetitions; and (f) changing at least one of the first and second predetermined thresholds if step (d) is repeated the predetermined number of repetitions.

2. The method of claim 1 wherein step (c) further comprises (i) determining whether two or more frequencies of the first group of frequencies, together yielding intermodulation interference at the first frequency, have a measured signal characteristic of one of a group consisting of the first and a second predetermined threshold, and (ii) if both determining steps of step (c) have a negative determination, selecting the first frequency.

3. The method of claim 1 further comprising:

(g) performing steps (a) through (e) for all of the fixed radio communication units.

4. The method of claim 3 further comprising repeating a cycle of steps (a) through (g) until a predetermined number of the plurality of fixed radio communication units select a same frequency as selected in a previous cycle.

5. A method of determining frequency assignment for a first of a plurality of fixed radio communication units each having a tunable transceiver and coupled to a communication controller, comprising:

(a) controlling all of the plurality of fixed radio communication units except the first fixed radio communication unit to transmit each at a predetermined frequency, and controlling the first fixed radio communication unit to measure a signal strength of a first group of frequencies including at least each predetermined frequency;

(b) determining a first frequency of the first group of frequencies having a lowest measured signal strength;

(c) determining whether two or more frequencies of the first group of frequencies, together yielding intermodulation interference at the first frequency, have a measured signal strength of at least a first predetermined threshold, and if not selecting the first frequency for use by the first fixed radio communication unit;

(d) when the determining step of step (c) has a positive determination, determining a next frequency of the first group of frequencies having a next lowest measured signal strength and repeating step (c) for the next frequency;

(e) repeating step (d) until one of the first group of frequencies is selected or a predetermined number of repetitions of step (d) is completed; and (f) changing at least one of the first and second predetermined threshold if step (d) is repeated the predetermined number of repetitions.

6. The method of claim 5 wherein step (c) further comprises (i) determining whether an adjacent one of the first group of frequencies has a measured signal strength of at least one of a group consisting of the first predetermined threshold and a second predetermined threshold, and (ii) if both determining steps of step (c) have a negative determination, selecting the first frequency.

7. The method of claim 5 further comprising:

(g) performing steps (a) through (e) for all of the plurality of fixed radio communication units.

8. A communications unit coupled, to a communications controller unit which is coupled to plural other communications unit, operable for selecting a frequency assignment for a communication channel, comprising:

a transceiver;

control means, coupled to the transceiver and the communications controller unit, for requesting all of the plural other communication units to transmit each at least one predetermined frequency, and for controlling the transceiver to measure a signal characteristic for each of a first group of frequencies including at least each predetermined frequency and send each measured signal characteristic to the control means;

store means, coupled to the control means, for receiving and storing each measured signal characteristic;

comparison means, coupled to the store means, for determining a first frequency of the first group of frequencies having an optimal measured signal characteristic; and determining means, coupled to the store means and control means, for determining whether an adjacent one of the first group of frequencies has a measured signal characteristic of at least a first predetermined threshold;

wherein the control means is further operable for selecting the first frequency for use by the first communication unit when the determining means has a negative determination and, in response to a positive determination by the determining means, is operable for controlling the comparison means to determine a next frequency of the first group of frequencies having a next lowest measured signal strength, and the determining means to determine whether a further adjacent one of the first group of frequencies to the next frequency has a measured signal strength of at least the first predetermined threshold and, is operable for changing the first predetermined threshold.

9. The communication unit of claim 8 wherein the determining means is further operable for determining whether two or more frequencies of the first group of frequencies, together yielding intermodulation interference at the first frequency, have a measured signal characteristic of at least a second predetermined threshold, and the control means is further operable for selecting the first frequency for use by the communication unit in response to negative determinations by the determining means.

10. The communication unit of claim 8 wherein the communication unit is a radio port and the communications controller unit is a radio port control unit.

* * * * *